(12) United States Patent  (10) Patent No.: US 7,844,272 B2
Kim  (45) Date of Patent: Nov. 30, 2010

(54) METHOD AND APPARATUS FOR PREVENTING EXCESSIVE HANDOVERS IN MOBILE COMMUNICATION SYSTEM

(75) Inventor: Yu-Shin Kim, Osani-si (KR)

(73) Assignee: Samsung Electronics Co., Ltd (KR)

( * ) Notice: Subject to any disclaimer, the term of this patent is extended or adjusted under 35 U.S.C. 154(b) by 894 days.

(21) Appl. No.: 11/590,098

(22) Filed: Oct. 31, 2006

(65) Prior Publication Data

US 2007/0099618 A1  May 3, 2007

(30) Foreign Application Priority Data

Oct. 31, 2005  (KR) ............................ 2005-0102762

(51) Int. Cl.
*H04W 360/00* (2006.01)
*H04W 36/00* (2009.01)
(52) U.S. Cl. ................. 455/436; 455/442; 455/439
(58) Field of Classification Search .............. 455/436, 455/439, 442
See application file for complete search history.

(56) References Cited

U.S. PATENT DOCUMENTS

| | | | | |
|---|---|---|---|---|
| 5,966,657 | A * | 10/1999 | Sporre ....................... | 455/425 |
| 2002/0042272 | A1 * | 4/2002 | Wedi et al. .................. | 455/442 |
| 2003/0206530 | A1 * | 11/2003 | Lindsay et al. .............. | 370/277 |
| 2005/0037758 | A1 * | 2/2005 | Rimoni ....................... | 455/436 |
| 2005/0090259 | A1 * | 4/2005 | Jain et al. ................... | 455/439 |
| 2005/0277415 | A1 * | 12/2005 | Hamalainen et al. ........ | 455/436 |
| 2006/0019664 | A1 * | 1/2006 | Nelakanti et al. ........... | 455/436 |
| 2007/0281696 | A1 * | 12/2007 | Vikberg et al. .............. | 455/436 |
| 2008/0242304 | A1 * | 10/2008 | Ju et al. ...................... | 455/439 |

OTHER PUBLICATIONS

Pollini, Trends in Handover Design, IEEE Communications Magazine, 1996.
Mouly et al., GSM System for Mobile Communications, 1993.

* cited by examiner

*Primary Examiner*—Dwayne D Bost
*Assistant Examiner*—Chhean Thao
(74) *Attorney, Agent, or Firm*—The Farrell Law Firm, LLP

(57) ABSTRACT

Provided is a method for preventing excessive handovers in a mobile communication system. In the method, a periodic measurement report message is transmitted from a mobile terminal to a network. The network determines, on the basis of the measurement report message from the mobile terminal, whether a handover of the mobile terminal needs to be performed. Thereafter, the network transmits a Handover_Command message to the mobile terminal if the handover of the mobile terminal needs to be performed. Upon receipt of the Handover_Command message, the mobile terminal performs a handover to a target handover cell according to the Handover_Command message, transmits a Handover_Complete message to the network, and transmits a first measurement report message including neighboring cell information set to Null from the mobile terminal to the network after the transmission of the Handover_Complete message.

15 Claims, 2 Drawing Sheets

METHOD AND APPARATUS FOR PREVENTING EXCESSIVE HANDOVERS IN MOBILE COMMUNICATION SYSTEM

PRIORITY

This application claims priority under 35 U.S.C. §119 to an application entitled "Method for Decreasing the Number of Handover in Mobile Communication System" filed in the Korean Intellectual Property Office on Oct. 31, 2005 and assigned Ser. No. 2005-102762, the contents of which are incorporated herein by reference.

BACKGROUND OF THE INVENTION

1. Field of the Invention

The present invention relates generally to a mobile communication system, and in particular, to a method and apparatus for preventing excessive handovers in a GSM (Global System for Mobile communications) system.

2. Description of the Related Art

In general, the second-generation (2G) mobile communication system providing a voice-oriented service uses a GSM scheme, an IS-95 (Interim Standard 95) scheme, and the like. A GSM system was commercialized from Europe in 1992. The GSM system provides a communication service using a Time Division Multiple Access (TDMA) scheme.

When moving across a boundary region between base stations (BSs) in a mobile communication system, a mobile terminal must perform a handover (or a handoff) so as to maintain its ongoing call. Handover is a process for switching a current call channel of a mobile terminal to another call channel such that an ongoing call of the mobile terminal can be maintained without interruption when the mobile terminal moves from a current cell into another cell.

Because the GSM system provides a communication service using the TDMA scheme, a GSM mobile terminal can perform a handover even during high-speed movement of 80-100 Km/h or more. However, the GSM system performs a call handover by a hard handover scheme, not a soft handover scheme by which a Code Division Multiple Access (CDMA) system performs a seamless call handover.

That is, during a handover process, after being allocated a channel for a handover from a network, the GSM mobile terminal disconnects a current call channel before switching to a new call channel. This disconnection of the current call channel temporarily interrupts an ongoing voice call of the GSM mobile terminal during the handover process.

The handover process of the GSM mobile terminal will be described in detail below. First, the GSM mobile terminal in a call mode (i.e., a dedicated mode) transmits a measurement report message to the network at fixed periods, for example, at every 104 frames or 102 frames. The contents of the measurement report message are shown in Table 1 below.

TABLE 1

| Index | Name | Value |
|---|---|---|
| 1 | Serving BCCH ARFCN | Frequency |
| 2 | RxLev Full Average | 0-63 |
| 3 | RxLev Sub Average | 0-63 |
| 4 | RxQual Full Average | 0-7 |
| 5 | RxQual Sub Average | 0-7 |
| 6 | Number of Entries | 0-6 |
| 7 | BCCH ARFCN [1]~[6] | Frequency |
| 8 | RxLev Average | 0-63 |
| 9 | BSIC | <ncc, bcc> |

As shown in Table 1, the contents of the measurement report message are classified into contents about a serving cell and contents about a neighboring cell. The measurement report message is used to report a frequency of the serving cell (Serving BCCH (Broadcast Control Channel) ARFCN (Absolute Radio Frequency Channel Numbers), a received (Rx) signal level, an Rx signal quality level, the number of neighboring cells, an Rx signal level of a frequency out of each BA list, and a Base Station Identity Code (BSIC). The number of neighboring cells are referred as Broadcast Control Channel Allocation (hereinafter 'BA') list number'.

Here, when a discontinuous transmission (DTX) scheme is used, if the RxLev Full Average and the RxQual Full Average are not used, the RxLev Sub Average and the RxQual Sub Average are used.

Upon receipt of a Handover_Command message from the network, the GSM mobile terminal performs a handover from the serving cell to the neighboring cell. Thereafter, the GSM mobile terminal transmits a Handover_Complete message to the network, thereby completing the handover process. At this point, a voice call of the GSM mobile terminal is interrupted during the handover process. For reconnection of the voice call, the GSM mobile terminal resumes a GSM traffic channel (TCH). Thereafter, the GSM mobile terminal transmits the measurement report message to the network at every 104 message frames (MF). Accordingly, the GSM mobile terminal can return to the dedicated mode.

However, because the conventional GSM mobile terminal transmits the measurement report message to the network directly after returning to the dedicated mode, a ping-pong handover may occur. The ping-pong handover is a phenomenon in which a handover occurs repeatedly when the strength of power frequently changes in an inter-cell boundary region. The ping-pong handover may cause an overload at a system controller of a mobile switching center. In addition, frequent handovers may occur in the inter-cell boundary region. These frequent handovers may cause a failure in a handover and thus generate a call-drop and a noise, which degrades the stability and voice quality performance of the GSM mobile terminal during a call operation.

SUMMARY OF THE INVENTION

An object of the present invention is to substantially solve at least the above problems and/or disadvantages and to provide at least the advantages below. Accordingly, an object of the present invention is to provide a method for preventing excessive handover in a mobile communication system.

According to an aspect of the present invention, in a method for preventing excessive handovers in a mobile communication system, a periodic measurement report message is transmitted from a mobile terminal to a network. The network determines, on the basis of the measurement report message from the mobile terminal, whether a handover of the mobile terminal needs to be performed. Thereafter, the network transmits a Handover_Command message to the mobile terminal if the handover of the mobile terminal needs to be performed. Upon receipt of the Handover_Command message, the mobile terminal performs a handover to a target handover cell according to the Handover_Command message, transmits a Handover_Complete message to the network, and transmits a first measurement report message including neighboring cell information set to Null from the mobile terminal to the network after the transmission of the Handover_Complete message.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention in unnecessary detail.

The present invention provides a method for preventing excessive handover in a mobile communication system.

Figure 1:
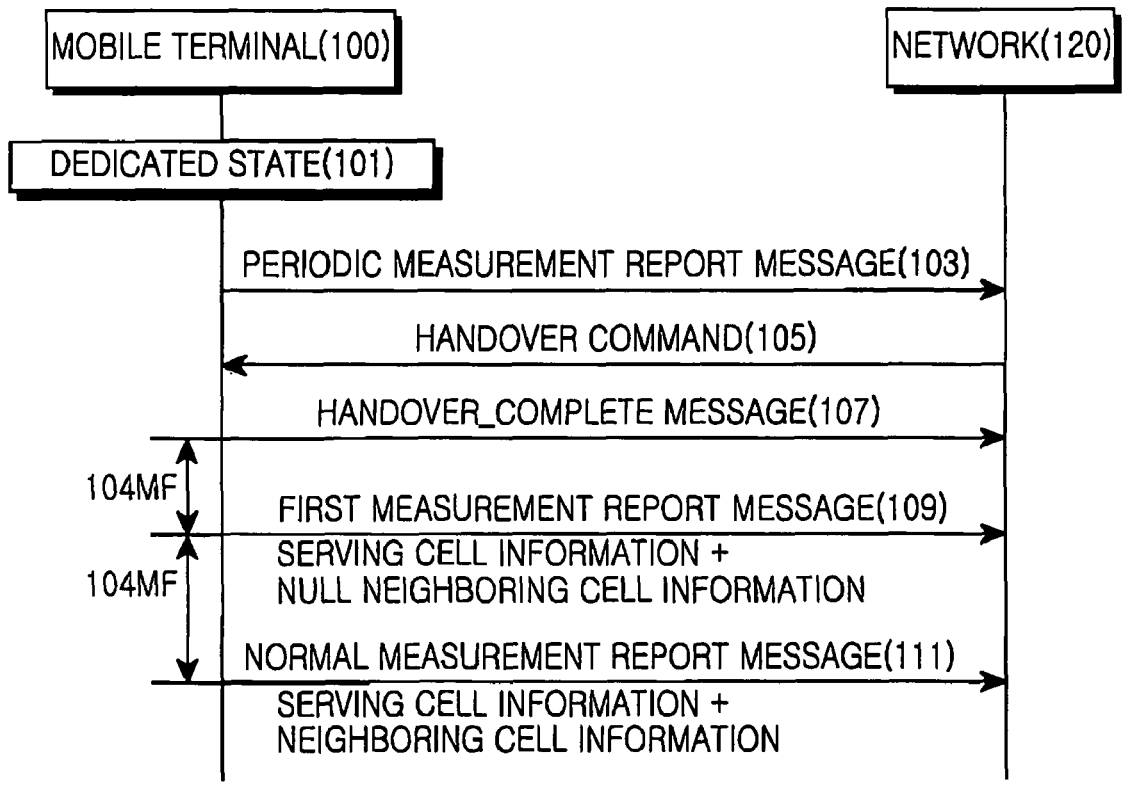
FIG. 1 is a flow diagram illustrating a message transmission process for preventing excessive handovers in a mobile communication system according to the present invention.

FIG. 1 is a flow diagram illustrating a message transmission process for preventing excessive handovers in a mobile communication system according to the present invention.

Referring to FIG. 1, a mobile terminal 100 is in a dedicated state (101). In the dedicated state, the mobile terminal 100 transmits a periodic measurement report message (103) to a network 120. The contents of the measurement report message are the same as those in Table 1 above.

When the mobile terminal 100 has a poor call quality, the network 120 determines a target handover cell of the mobile terminal 100 by reference to the measurement report message and transmits a Handover_Command message (105) to the mobile terminal 100 to command the mobile terminal 100 to perform a handover to the target handover cell. The Handover_Command message contains a channel to be newly allocated to the mobile terminal 100.

Upon receipt of the Handover_Command message, the mobile terminal 100 performs a handover operation and transmits a Handover_Complete message to the network 120 in step 107. At this point, an ongoing call of the mobile terminal 100 is temporarily interrupted during the handover operation. After lapse of 104 MF (message frame) (i.e., 480 msec) from the transmission of the Handover_Complete message, the mobile terminal 100 sets neighboring cell information of the measurement report message to Null and transmits a first measurement report message (109) including the Null neighboring cell information to the network 120. That is, even though the mobile terminal 100 has the neighboring cell information, the mobile terminal 100 sets the neighboring cell information to Null. The contents of the first measurement report message are shown in Table 2 below.

TABLE 2

| Name | Value |
| --- | --- |
| Serving BCCH ARFCN | 28 |
| RxLev Full Average | GSM RXVEV 17 |
| RxLev Sub Average | GSM RXVEV 17 |
| RxQual Full Average | 4 |

TABLE 2-continued

| Name | Value |
| --- | --- |
| RxQual Sub Average | 5 |
| Number of Entries | 0 |
| Entry: [1] | Null |
| Entry: [2] | Null |
| Entry: [3] | Null |
| Entry: [4] | Null |
| Entry: [5] | Null |
| Entry: [6] | Null |

As shown in Table 2, the number of entries is set to '0' and six neighboring cells are set to Null.

After the lapse of 104 MF from the transmission of the first measurement report message, the mobile terminal 100 transmits a second measurement report message (111), which is normal as shown in Table 1, to the network 120.

Figure 2:
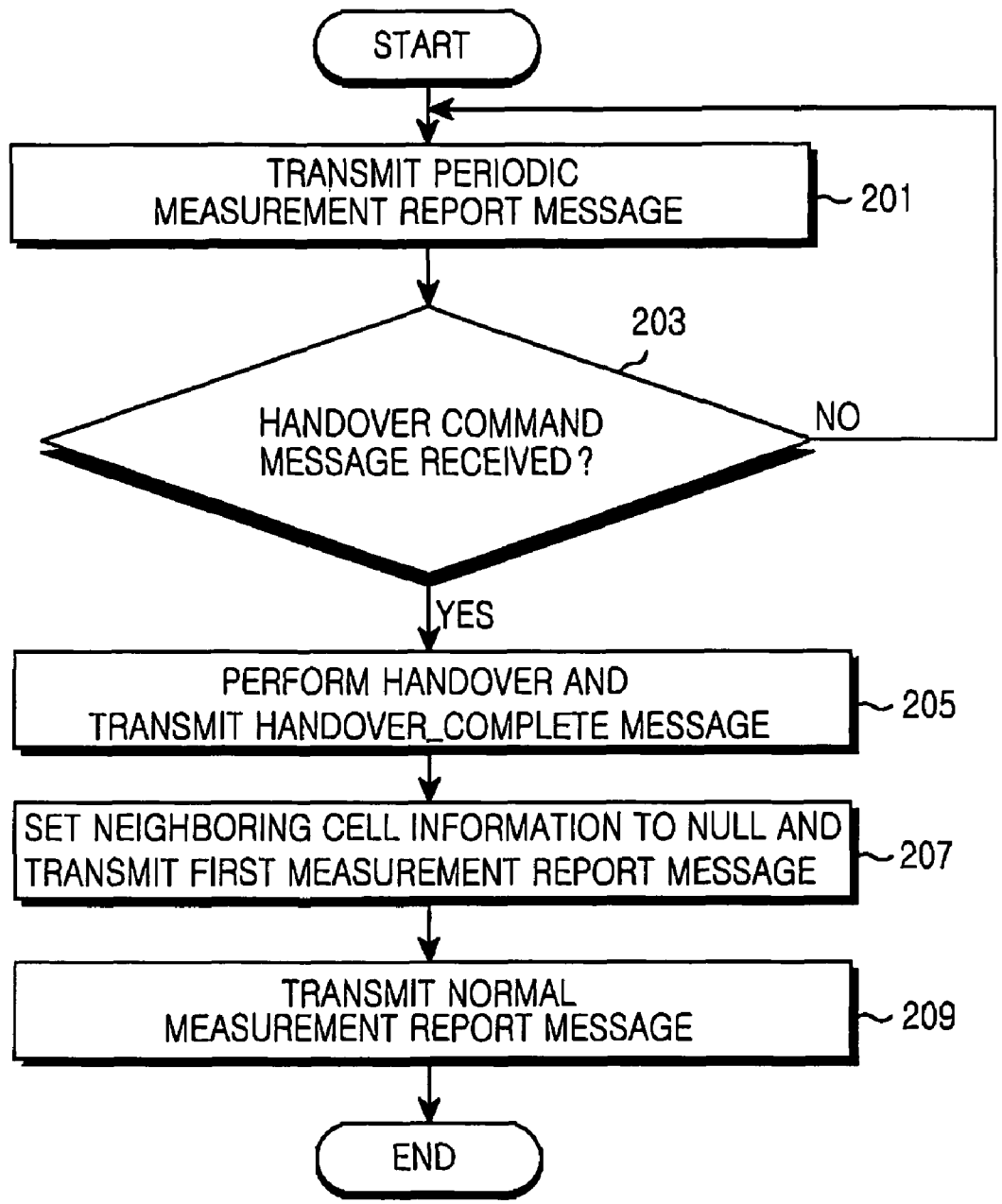
FIG. 2 is a flowchart illustrating a message transmission process for preventing excessive handovers in a mobile communication system according to the present invention.

FIG. 2 is a flowchart illustrating a message transmission process for preventing excessive handovers in a mobile communication system according to the present invention.

Referring to FIG. 2, the mobile terminal 100, which is in a dedicated mode, transmits a periodic measurement report message to the network 120 in step 201. The contents of the measurement report message may be the same as those in Table 1.

In step 203, the mobile terminal 100 determines if it receives a Handover_Command message from the network 120. At this point, when the mobile terminal 100 has a bad call quality, the network 120 determines a target handover cell of the mobile terminal 100 by reference to the measurement report message from the mobile terminal 100 and transmits the Handover_Command message to the mobile terminal 100 to command the mobile terminal 100 to perform a handover to the target handover cell.

If the Handover_Command message is received from the network 120, the mobile terminal 100 performs a handover to the target handover cell and transmits a Handover_Complete message to the network 120 in step 205. On the other hand, if the Handover_Command message is not received from the network 120, the mobile terminal returns to step 201 and continuously transmits the periodic measurement report message until it receives the Handover_Command message from the network 120.

In step 207, the mobile terminal 100 transmits a first measurement report message including the Null neighboring information. That is, even though the mobile terminal 100 has the neighboring cell information, the mobile terminal 100 sets the neighboring cell information to Null. The contents of the first measurement report message may be the same as those in Table 2.

After the transmission of the first measurement report message, the mobile terminal 100 transmits a normal measurement report message as shown in Table 1 to the network 120 in step 209. Thereafter, the mobile terminal ends the message transmission process.

A performance test of a mobile communication system using the method for preventing excessive handovers was made with the mobile terminal moved at 100 Km/h for 90 minutes. According to the results of the system performance test, the number of handovers in a GSM cell was reduced and also noise was reduced by about 20-30% in a poor network environment.

As described above, the present invention sets the neighboring cell information to Null when the first measurement report message is transmitted to the network in the mobile communication system after the handover operation of the mobile terminal. Accordingly, it is possible to prevent a call-drop that may be caused by a failure in a handover due to ping-pong handovers or successive handovers. Also, noise can be reduced, thereby making it possible to enhance the stability and voice quality performance of the mobile terminal.

While the above description is directed to a method for preventing excessive handovers, a mobile communication terminal employing this method can also be implemented.

The mobile communication terminal includes, but not limited to, a cellular phone, a personal communication system (PCS) terminal, a personal data assistant (PDA) and an international mobile communication 2000 (IMT-2000) terminal.

The mobile communication terminal includes a controller (e.g., an MPU), a read only memory (ROM), a random access memory (RAM), a flash ROM, a keypad or a touch pad, a display unit, a coder-decoder (CODEC), a microphone, a speaker, an antenna, a radio frequency (RF) module and a baseband processor.

The controller controls an overall operation of the mobile communication terminal. For example, the controller processes and controls voice and data communication.

In addition to the general functions, the controller controls a method for preventing excessive handovers described above.

The ROM stores a variety of reference data and microcodes of a program for the process and control operation of the controller. According to the present invention, the ROM stores a program for selecting, from a plurality of characters selected by an input key, one character according to input of a sequence key. The RAM is a working memory of the controller, which stores temporary data that is generated during the execution of various programs. The flash ROM stores a variety of updatable data such as a phone book, an outgoing message and an incoming message.

The keypad includes numeric keybuttons of digits 0-9 and a plurality of function keybuttons such as Menu, Cancel (delete), Confirmation, Talk, End, Internet connection, Navigation (▲/▼/◀/▶) and character input keybuttons. The keypad 108 provides the controller 100 with key input data that corresponds to a keybutton pressed by a user. Or the touch pad includes elements corresponding to the keybuttons of the keypad.

The display unit displays status information generated during operations, numerals and characters, moving and still pictures, and other information. The display unit may be a color liquid crystal display (LCD).

The CODEC connected to the controller, the speaker and the microphone connected to the CODEC constitute an audio input/output block that is used for telephone communication and voice recording. The CODEC converts PCM data received from the controller into analog audio signals and outputs the analog audio signals to the speaker. Also, the CODEC converts audio signals received through the microphone into PCM data and provides the PCM data to the controller.

The RF module down-converts an RF signal received through the antenna and provides the resulting baseband signal to a baseband processor. Also, the RF module up-converts a baseband signal provided from the baseband processor and transmits the resulting RF signal through the antenna. The baseband processor processes the baseband signals that are exchanged between the RF module and the controller. For example, in the case of data transmission, the baseband processor performs channel coding and spreading on data to be transmitted. In the case of data reception, the baseband processor performs despreading and channel decoding on received data.

Here, the antenna and the RF module collectively referred to as a transmitting means for transmitting the signal to the network and input means for receiving from signals from the network. The signal includes, but not limited to, measurement report message and handover command.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for reporting neighbor cell information in a mobile communication terminal comprising the steps of:
   receiving a handover command message from a network;
   performing a handover to a target handover cell according to the handover command message and transmitting a handover_complete message; and
   transmitting a first measurement report message including neighboring cell information set to null to the network.

2. The method of claim 1, further comprising transmitting a second measurement report message including actual neighboring cell information to the network after a predetermined time from the transmission of the first measurement report message.

3. A method for transmitting a measurement report message in a mobile communication terminal comprising the steps of:
   transmitting a periodic measurement report message to a network;
   performing a handover to a target handover cell according to a handover command message from the network;
   transmitting a handover complete message to the network; and
   transmitting a first measurement report message including neighboring cell information set to null to the network after the completion of the handover to the target handover cell.

4. The method of claim 3, further comprising transmitting a second measurement report message including actual neighboring cell information to the network after a predetermined time from the transmission of the first measurement report message.

5. A method for preventing excessive handovers in a mobile communication terminal, the method comprising the steps of:
   transmitting a periodic measurement report message to a network;
   receiving a handover command message from the network;
   performing a handover to a target handover cell;
   transmitting a handover complete message to the network; and
   transmitting a measurement report message in which neighboring cell information is set to null for a predetermined time;
   transmitting a second measurement report message including actual neighboring cell information to the network.

6. The method of claim 5, wherein the handover command message is determined on the basis of the measurement report message from the mobile terminal whether a handover of the mobile terminal needs to be performed.

7. A mobile communication terminal comprising:
   a receiving means for receiving a handover command message from a network; and a controller for performing a handover to a target handover cell according to the handover command message and transmitting a handover complete message and transmitting a first measurement report message including neighboring cell information set to null to the network.

8. The mobile communication terminal of claim 7, wherein the controller further performs transmitting a second measurement report message including actual neighboring cell information to the network after a predetermined time from the transmission of the first measurement report message.

9. A mobile communication terminal comprising:
   a transmitting means for transmitting a periodic measurement report message to a network; and
   a controller for performing a handover to a target handover cell according to a handover command message from the network and transmitting a handover complete message to the network, a first measurement report message including neighboring cell information set to null to the network after the completion of the handover to the target handover cell through the transmitting means.

10. The mobile communication terminal of claim 9, wherein the controller further performs transmitting a second measurement report message including actual neighboring cell information to the network after a predetermined time from the transmission of the first measurement report message.

11. A mobile communication terminal comprising:
   a transmitting means for transmitting a periodic measurement report message to a network;
   a receiving means for receiving a handover command message from the network; and
   a controller for performing a handover to a target handover cell and transmitting a handover complete message to the network, a measurement report message in which neighboring cell information is set to null for a predetermined time and a second measurement report message including actual neighboring cell information to the network through the transmitting means.

12. The mobile communication terminal of claim 11, wherein the handover command message is determined on the basis of the measurement report message from the mobile terminal whether a handover of the mobile terminal needs to be performed.

13. A mobile communication system comprising:
   a mobile communication terminal comprising,
   transmitting means for transmitting a periodic measurement report message to a network; a receiving means for receiving a handover command message from the network; and a controller for performing a handover to a target handover cell and transmitting a handover complete message to the network and a first measurement report message in which neighboring cell information is set to null for a predetermined time; and
   the network mobile receiving a periodic measurement report message from the mobile communication terminal; transmitting a handover command message to the mobile communication terminal; and receiving a measurement report message in which neighboring cell information is set to null for a predetermined time from the mobile communication terminal.

14. The mobile communication system of claim 13, wherein the handover command message is determined on the basis of the measurement report message from the mobile terminal whether a handover of the mobile terminal needs to be performed.

15. The mobile communication system of claim 13, wherein the controller further transmits a second measurement report message including actual neighboring cell information to the network.

* * * * *